United States Patent
Wilkerson

(10) Patent No.: US 6,771,176 B2
(45) Date of Patent: Aug. 3, 2004

(54) ACCELERATION MONITORING AND SAFETY DATA ACCOUNTING SYSTEM FOR MOTOR VEHICLES AND OTHER TYPES OF EQUIPMENT

(76) Inventor: William Jude Wilkerson, 1430 Crofton Pkwy., Crofton, MD (US) 21114

( * ) Notice: Subject to any disclaimer, the term of this patent is extended or adjusted under 35 U.S.C. 154(b) by 0 days.

(21) Appl. No.: 09/808,734

(22) Filed: Mar. 15, 2001

(65) Prior Publication Data

US 2002/0000910 A1 Jan. 3, 2002

Related U.S. Application Data

(63) Continuation-in-part of application No. 09/321,896, filed on May 28, 1999, now Pat. No. 6,204,757.
(60) Provisional application No. 60/087,137, filed on May 29, 1998.

(51) Int. Cl.[7] .............................................. G08B 23/00
(52) U.S. Cl. ...................... 340/576; 340/438; 340/439; 340/870.05; 340/936; 340/993
(58) Field of Search ................................ 340/439, 539, 340/576, 936, 993, 870.05, 457, 438

(56) References Cited

U.S. PATENT DOCUMENTS

| | | | |
|---|---|---|---|
| 5,081,593 A | * | 1/1992 | Pollack ........................ 395/88 |
| 5,446,659 A | * | 8/1995 | Yamawaki ................... 340/438 |
| 5,570,087 A | * | 10/1996 | Lemelson .................... 340/576 |
| 5,572,428 A | * | 11/1996 | Ishida et al. ................. 340/903 |
| 5,699,040 A | * | 12/1997 | Matsuda ...................... 340/435 |
| 5,721,540 A | * | 2/1998 | Ellis ............................ 340/988 |
| 5,802,479 A | * | 9/1998 | Kithil et al. ................. 340/562 |
| 6,060,989 A | * | 5/2000 | Gehlot ........................ 340/576 |

* cited by examiner

*Primary Examiner*—Jeffery Hofsass
*Assistant Examiner*—Hung Nguyen
(74) *Attorney, Agent, or Firm*—Law Offices of Royal W. Craig

(57) ABSTRACT

An improved acceleration/deceleration monitoring system for motor vehicles and other types of human-operated equipment is herein disclosed. This system measures and records events where preset acceleration/deceleration parameters are exceeded. The system is equipped with data communication means that allows an employer, a parent, an insurance carrier, or any other interested person to verify that the vehicle in question is operated in an appropriate manner. The system records each incident of vehicle acceleration (or deceleration) that exceeds established parameters while noting the date, time of day, and location of the incident. The information retrieved is compiled in a data record and stored in a storage system for instantaneous use or retrieval when desired.

16 Claims, 2 Drawing Sheets

ACCELERATION MONITORING AND SAFETY DATA ACCOUNTING SYSTEM FOR MOTOR VEHICLES AND OTHER TYPES OF EQUIPMENT

CROSS-REFERENCE TO RELATED APPLICATIONS

The present application is a continuation-in-part of U.S. patent application Ser. No. 09/321,896 May 28, 1999 U.S. Pat. No. 6,204,757 which claims the benefit of 60/087,137 filed on May 29, 1998.

BACKGROUND OF THE INVENTION

1. Field of the invention

The present invention relates to systems for registering and recording the acceleration (or deceleration) of commercial or private motor vehicles and other human-operated equipment. In particular, the present invention relates to systems for detecting, monitoring, and storing acceleration and other safety parameter data, along with time and position data, for immediate usage or later retrieval.

2. Description of the Background

Safe operational conditions for any motor vehicle require that acceleration (or deceleration) events associated with forward/backward movement, braking, and turning do not exceed parameters which (1) would stress the structural integrity of the given vehicle type/model, (2) would represent sensible driving tactics based on existing road conditions (i.e. the parameters for good versus inclement weather conditions would vary), (3) would represent sensible driving tactics based on existing road design (e.g. poorly designed highway on/off ramps, curving/winding roads where the posted speed limit is incompatible with driving in good/excellent weather conditions), (4) may cause load shifts within the vehicle, (5) are considered excessive as indicated by vehicle tire wear, (6) would challenge a vehicle's resistance to roll-over during a turning event, and (7) demonstrate that the vehicle has been operated in an unsafe manner.

In order to reduce insurance and other expenses caused by injuries to employees, employers of truck drivers or large commercial equipment operators often set forth safety policies including guidelines for vehicle operation. Unfortunately, the prior art devices lack any method of consistently and accurately measuring and recording an individual's operation of a vehicle, making the policing of any such guidelines extremely difficult.

Systems for monitoring vehicular use are well known in the prior art. For example, U.S. Pat. No. 4,303,906 to Weakley discloses an apparatus for monitoring the manner in which a vehicle is driven. The apparatus includes a number of mercury switches which are arranged to detect excessive accelerative forces in chosen horizontal directions and in the vertical direction. Each switch is so arranged that contacts at the lower end of the capsule are normally bridged by the mercury but are open circuited when the mercury is subjected to a predetermined accelerative force. Detectors sense the open circuiting of a switch and cause an alarm to be sounded and the advance of a counter. This invention does not record the time or position of the vehicle at the moment an acceleration parameter is exceeded.

Another example of the prior art is U.S. Pat. No. 5,754,964 to Rettig et al. which discloses an apparatus and method for storing various vehicle operating characteristics upon sensing a vehicle acceleration having a magnitude that exceeds a predetermined limit. In this manner, the vehicle owner or fleet manager can determine whether the vehicle operator uses the service brakes excessively. This invention is drawn specifically to the braking process and does not record the time or position of the vehicle at the moment the acceleration parameter is being measured.

Yet a third example is that of U.S. Pat. No. 5,570,087 to Lemelson. It discloses a system and method for monitoring the performance of a motor vehicle. The vehicle's instantaneous accelerations in at least two directions are continually sensed and stored as coded signals in a computer memory along with associated time and date codes. By means of inertial navigation and/or radio transmissions from global positioning system satellites, the vehicle's global position is also computed and stored. The stored performance variables are analyzed over a period of time in order to evaluate how the vehicle is being driven. When an erratic or otherwise hazardous driving pattern is detected, signals may be generated to warn the driver and/or traffic authorities. This system, however, does not possess the ability to vary acceleration parameters in accordance with changing weather conditions or poorly designed roads. It also differs from the present invention due to its continuous sensing approach as compared with the present invention's on-demand, or intermittent, approach to acceleration event recordation.

In light of the above information, it would therefore be advantageous to provide a system for accurately and consistently measuring and recording the acceleration (or deceleration) of both private and commercial vehicles and heavy equipment. Operational liability could be reduced if repeated events of unsafe acceleration (or deceleration) could be identified and corrected for any given operator or typically traveled route due to poor operating practices, or road, vehicle, or weather conditions.

SUMMARY OF THE INVENTION

It is, therefore, an object of the present invention to provide a system for detecting, measuring, and recording the acceleration (or deceleration) of private and commercial vehicles and heavy equipment.

It is another object of the present invention to provide a system for measuring and recording other safety-related information in such vehicles, such as date/time of occurrence and vehicle position It is a further object of the present invention to organize the data retrieved from the various sources herein described into a usable and consistent record, which can then be compiled with like records to analyze acceleration/deceleration and other safety parameters in a comprehensive and statistical manner.

It is a further object of the present invention to provide the above objects in an economical and facile manner, using existing, commercially available components to the extent practical.

In accordance with the above objects, an improved acceleration/deceleration monitoring system is provided which measures and records events where preset acceleration/deceleration parameters are exceeded. The system is equipped with data communication means that allows an employer, a parent, an insurance carrier, or any other interested person to verify that the vehicle in question is operated in an appropriate manner. The system records each incident of vehicle acceleration (or deceleration) that exceeds established parameters while noting the date, time of day, and location of the incident. The information retrieved is compiled in a data record and stored in a storage system for instantaneous use or retrieval when desired.

DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
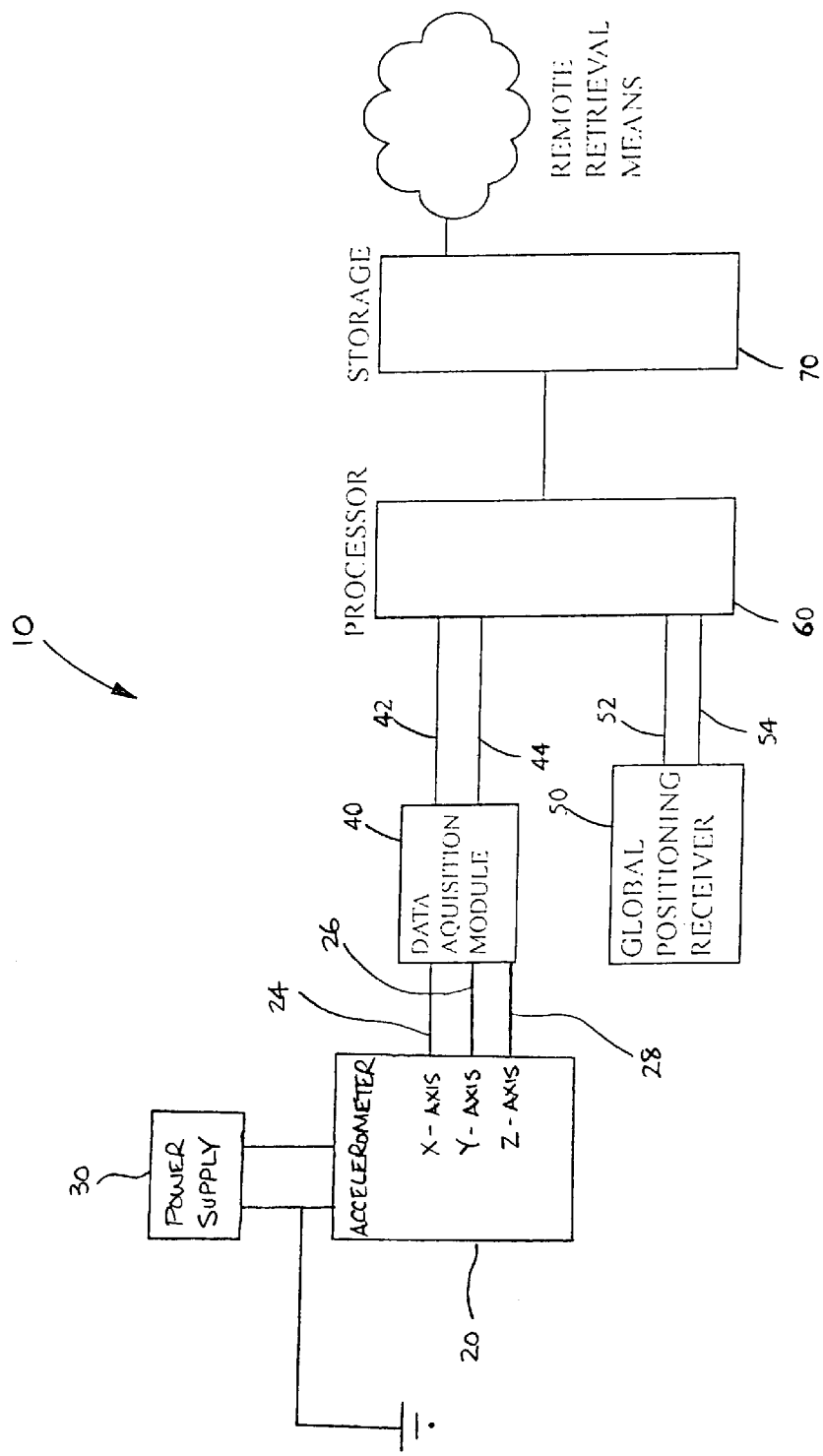
FIG. 1 is a schematic block diagram showing the acceleration monitoring and safety data accounting system 10 according to a preferred embodiment of the present invention.

As shown in the schematic block diagram of FIG. 1, the acceleration monitoring and safety data accounting system 10 of the present invention comprises a multiple axis accelerometer 20 complete with power supply 30, a data acquisition module 40 to receive analog signal input from the accelerometer 20, a global positioning receiver 50 to record the vehicle location and time reference, processing means 60 programmed to poll the data acquisition module 40 and the global positioning receiver 50 and compile a unified data record, and storage means 70 for storage of the unified data records for later retrieval.

The accelerometer 20 may be any well-known and commercially available unit which is equipped with appropriate measurement capability. The accelerometer 20 must be capable of detecting vehicle acceleration (or deceleration) in both the horizontal and vertical planes (i.e. the X-, Y-, and Z-axes). A preferred accelerometer 20 is the Model CXLO4M3 unit commercially available from Crossbow Technology, Inc., although any standard accelerometer capable of measurement along three axes of movement would suffice. Analog Devices' Model ADXL202 is another example of an accelerometer capable of achieving sufficient accuracy at low cost. The accelerometer 20, typically possessing either a plastic or an aluminum casing, is rigidly attached to the frame of the vehicle. A power supply 30 (typically less than 12 volts) is preferably drawn from the vehicle's electrical system to operate the accelerometer 20.

An electrical connection 24 carries the analog first signal (acceleration along the X-axis) from the accelerometer 20 to the data acquisition module 40. Parallel electrical connections 26, 28 carry the second (acceleration along the Y-axis) and third (acceleration along the Z-axis) analog signals, respectively, between the two devices. In accordance with the preferred embodiment, the data acquisition means may be a commercially available unit manufactured by B&B Electronics as part number 2320PSDA. This particular optically isolated serial data acquisition module 40 provides two digital I/O lines and six A/D input channels. Of the six input channels, four possess signal conditioning circuitry. It can be readily mounted anywhere in the vehicle to provide convenient access for the wiring of the accelerometer 20, or any other analog input circuitry.

The present invention requires that an event date/time and vehicle position record be made simultaneous to any accelerometer record. A particularly preferred global positioning receiver 50 is commercially available from Mitel Semiconductor as part number GP2000. This particular global positioning receiver component has been used to build a variety of commercially available, hand held Global Positioning System (GPS) products, and is well suited for incorporation with a processor and peripherals for storage within one housing. For purposes of the present invention, the housing may be mounted on the vehicle in a location convenient for servicing the system and for making the required connection to retrieve unified data records. It should be readily apparent to one of ordinary skill in the relevant art that if position data is not needed in a given embodiment, the global positioning receiver 50 can be replaced with an electronic timepiece that provides only a time data record to processor 60. Further, various embodiments of processor 60 already employ a time clock that can provide a time reference to processor 60.

Further referring to FIG. 1, a serial data connection 42 carries the unified data record, which reflects the analog first, second, and third signals from the accelerometer 20, and any other analog safety data signals herein contemplated, from the data acquisition module 40 to the processor 60. Likewise, a serial data connection 52 carries the unified data record reflecting the position and date/time signals from the global positioning receiver 50 to the processor 60.

In accordance with the preferred embodiment, a suitable processor 60 is the commercially available unit manufactured by Toshiba as part number TMPR3922U. This CPU application is based on Toshiba's TX39 MIPS RISC processor core, and is designed for compact applications such as personal digital assistants and interactive communication devices. An alternative processor 60 is the commercially available unit manufactured by Adastra Systems as part number P-586, which is a self-contained embedded system based on an Intel Pentium-class microprocessor. Both of the illustrative processors are capable of polling the data acquisition module 40 through a data connection 44, and the global positioning receiver 50 through a data connection 54, at discrete time intervals or at the occurrence of a discrete event. In either case, the processor 60 may be contained in the same housing as the global positioning receiver 50, is supported by all standard and necessary peripheral components including RAM memory, and is powered from the vehicle's electrical distribution system.

The processor 60 is controlled by resident software written to identify and record unsafe acceleration events. Parameters (e.g. G-force measurements) for unsafe acceleration events based on vehicle type or as established by authorized safety personnel are resident in the software. The software facilitates the generation of polling events whenever one or more acceleration parameter is exceeded, polls the various analog and digital inputs at specified time intervals as long as an acceleration parameter remains in an exceeded condition, and compiles the resulting unified data records for storage or instantaneous monitoring/recording. The software may comprise a sequence of well known and commercially available real time control modules preferably authored in the C++ programming language, and compiled with a commercially available compiler compatible with the processor class employed and specially tailored for embedded systems. Once the processor 60 has polled the various accelerometer and safety data inputs, the processor 60 compiles a unified data record in one of many known standardized formats for storage in storage means 70. In the preferred embodiment, the storage means 70 is commercially available digital memory such as DRAM or SDRAM. It should be readily apparent to one of ordinary skill that commercially available flash memory, magnetic disc memory, or optical memory can be employed as the storage means 70. Flash memory has the added advantage that it comes in the form of cards that are compact and easy to transport to a remote computer for analysis. Furthermore, they do not require a continuous power supply to retain data.

Moreover, it should be readily apparent to one of ordinary skill in the art of the present invention that the retrieval of the unified data records from the storage means 70 need not be accomplished by a physical connection between the processor 60 and the storage means 70. The retrieval of the unified data records can be easily accomplished by the incorporation of IP modem technology communicating with the processor 60 and digital cellular communications to relay data from the IP modem of the vehicle system to an IP modem at a remote location, in conjunction with the storage means 70 at the remote location. Satellite telecommunication services can also be used in place of digital cellular communication services.

Figure 2:
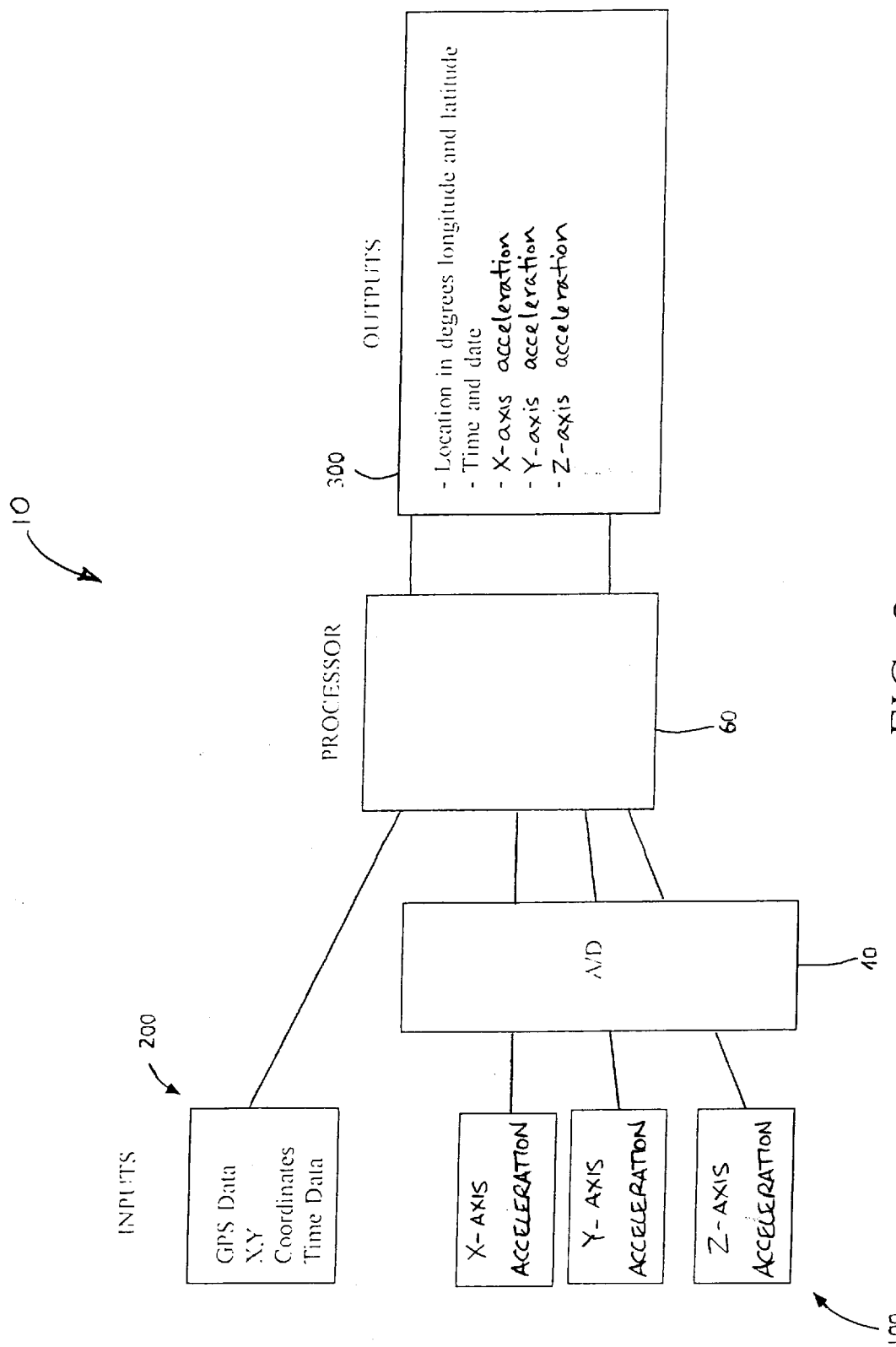
FIG. 2 is a schematic diagram of the functionality of the electronic data portions of the acceleration monitoring and safety data accounting system 10 according to a preferred embodiment of the present invention.

FIG. 2 is a schematic diagram of the functionality of the electronic data portions of the acceleration monitoring and safety data accounting system 10 according to a preferred embodiment of the present invention. Analog inputs 100 such as the X-, Y-, and Z-axis components of vehicle acceleration are processed by the data acquisition module 40 into digital inputs 200. Additional inputs include vehicle position and date/time records which are already in a compatible digital form for processing. The processor 60 compiles a unified data record 300 which contains fields for each of the desired data in the record, at least including (1) X-axis acceleration; (2) Y-axis acceleration; (3) Z-axis acceleration; (4) GPS coordinate data for vehicle position; and (5) date and time fields which are already in a compatible digital form for processing. The foregoing information is stored as a unified data record for later retrieval. The record can be queried for acceleration (or deceleration) events associated with forward/backward movement, braking, and turning. Moreover, the record can be queried for patterns of abnormal acceleration (or deceleration) from gunning, braking, or reckless turning. Specific events and pattern data can be compared to baseline parameters to ensure that a given driver follows proper guidelines such as: (1) minimizing undue stress on the structural integrity of the given vehicle type/model, (2) employing sensible driving tactics based on existing road conditions (i.e. the parameters for good versus inclement weather conditions would vary), (3) employing sensible driving tactics based on existing road design (e.g. poorly designed highway on/off ramps, curving/winding roads where the posted speed limit is incompatible with driving in good/excellent weather conditions), (4) not causing load shifts within the vehicle, (5) avoiding vehicle tire wear, (6) not being susceptible to roll-over during a turning event, and (7) generally operating the vehicle in a safe manner.

In order to reduce insurance and other expenses caused by injuries to employees, employers of truck drivers or large commercial equipment operators often set forth safety policies including guidelines for vehicle operation. Unfortunately, the prior art devices lack any method of consistently and accurately measuring and recording an individual's operation of a vehicle, making the policing of any such guidelines extremely difficult.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth herein.

I claim:

1. A vehicle operation and performance monitoring and accounting system for a human-operated vehicle comprising:

acceleration/deceleration indicating means for generating a first signal when acceleration or deceleration of said vehicle, in the direction of an X-axis, is detected;

acceleration/deceleration indicating means for generating a second signal when acceleration or deceleration of said vehicle, in the direction of a Y-axis is detected;

acceleration/deceleration indicating means for generating a third signal when acceleration or deceleration of said vehicle, in the direction of a Z-axis, is detected, said Z-axis being perpendicular to a plane containing said X-axis and said Y-axis;

global positioning means for generating position data;

software containing a plurality of vehicle operating parameters defining appropriate operation of a vehicle;

processor means for receiving said first, second, and third signals, and said position data, and said plurality of vehicle operating parameters, and constructing a unified data record therefrom at a plurality of predetermined time intervals; and storage means for compiling a plurality of said unified data records for immediate review or later retrieval;

wherein said unified data record comprises contemporaneous X-axis, Y-axis, and Z-axis acceleration/ deceleration data, and position data, and appropriate operating parameter data, providing a record of a human operator's habits and performance with regard to the operation of said vehicle.

2. The system of claim 1, further comprising time and date indicating means for generating a time/date data record;

wherein said processor means receives and incorporates said time/date data record into said unified data record.

3. The system of claim 1, wherein said acceleration/ deceleration indicating means comprises a multi-axis accelerometer responsive to acceleration/deceleration in any of three axes of motion.

4. The system of claim 1, wherein said processor means is comprised of an embedded microcomputer.

5. The system of claim 4, wherein said processor means further comprises an analog-to-digital conversion means for receiving said first, second, and third signals.

6. A vehicle operation and performance monitoring and accounting system for a human-operated vehicle comprising:

acceleration/deceleration indicating means for generating a first signal when acceleration or deceleration of said vehicle, in the direction of an X-axis, is detected;

acceleration/deceleration indicating means for generating a second signal when acceleration or deceleration of said vehicle, in the direction of a Y-axis is detected;

acceleration/deceleration indicating means for generating a third signal when acceleration or deceleration of said vehicle, in the direction of a Z-axis, is detected, said Z-axis being perpendicular to a plane containing said X-axis and said Y-axis;

global positioning means for generating position data;

software containing a plurality of vehicle operating parameters defining appropriate operation of a vehicle;

processor means for receiving said first, second, and third signals, and said position data, and said plurality of vehicle operating parameters, and constructing a unified data record at the occurrence of a plurality of discrete events; and storage means for compiling a plurality of said unified data records for immediate review or later retrieval;

wherein said unified data record comprises contemporaneous X-axis, Y-axis, and Z-axis acceleration/deceleration data, and position data, and appropriate operating parameter data, providing a record of a human operator's habits and performance with regard to the operation of said vehicle.

7. The system of claim 6, wherein said discrete events comprise acceleration or deceleration in the direction of the X-axis, Y-axis, and/or Z-axis.

8. The system of claim 6, further comprising time and date indicating means for generating a time/date data record;

wherein said processor means receives and incorporates said time/date data record into said unified data record.

9. The system of claim 6, wherein said acceleration/deceleration indicating means comprises a multi-axis accelerometer responsive to acceleration/deceleration in any of three axes of motion.

10. The system of claim 6, wherein said processor means is comprised of an embedded microcomputer.

11. The system of claim 10, wherein said processor means further comprises an analog-to-digital conversion means for receiving said first, second, and third signals.

12. A method of monitoring and accounting the operation and performance of a human-operated vehicle comprising:

detecting acceleration/deceleration of said vehicle in the direction of an X-axis;

detecting acceleration/deceleration of said vehicle in the direction of a Y-axis;

detecting acceleration/deceleration of said vehicle in the direction of a Z-axis, said Z-axis being perpendicular to a plane containing said X-axis and said Y-axis;

detecting a position of said vehicle;

defining appropriate operating parameters for said vehicle, constructing a unified data record at a plurality of intervals; and storing said unified data records for immediate review or later retrieval;

wherein said unified data record comprises contemporaneous X-axis, Y-axis, and Z-axis acceleration/deceleration data, and vehicle position data, and appropriate operating parameter data, providing a record of a human operator's habits and performance with regard to the operation of said vehicle.

13. The method of claim 12, further comprising the step of forming a time/date data record;

wherein said unified data record further comprises said time/date data record.

14. The method of claim 12, wherein said plurality of intervals comprise the detection of acceleration or deceleration in the direction of the X-axis, Y-axis, and/or Z-axis.

15. The method of claim 12, wherein said plurality of intervals comprise predetermined time intervals.

16. The method of claim 15, further comprising the step of forming a time/date data record;

wherein said unified data record further comprises said time/date data record.

* * * * *